United States Patent
Neubauer et al.

[11] Patent Number: 6,133,541
[45] Date of Patent: Oct. 17, 2000

[54] METHOD FOR CUTTING Y BEVELS

[75] Inventors: Norbert Neubauer, Nuremberg; Peter Heine, Maintal, both of Germany

[73] Assignee: Messer Cutting & Welding Aktiengesellschaft, Germany

[21] Appl. No.: 09/366,259

[22] Filed: Aug. 3, 1999

[30] Foreign Application Priority Data

Aug. 4, 1998 [DE] Germany ............... 198 35 062

[51] Int. Cl.$^7$ ............................................. B23K 9/00
[52] U.S. Cl. ....................... 219/121.44; 219/121.6
[58] Field of Search ............... 219/121.44, 121.41, 219/121.39, 121.67, 121.72, 121.6; 83/15–16, 170–171

[56] References Cited

U.S. PATENT DOCUMENTS

| | | | |
|---|---|---|---|
| 3,597,578 | 8/1971 | Sullivan | 219/121.67 |
| 3,604,890 | 9/1971 | Mullaney | 219/121.67 |
| 4,235,647 | 11/1980 | Sano et al. | 219/68 |
| 4,689,467 | 8/1987 | Inoue | 219/121.6 |
| 5,360,495 | 11/1994 | Schuler et al. | 148/565 |

*Primary Examiner*—Teresa Walberg
*Assistant Examiner*—Quang Van
*Attorney, Agent, or Firm*—Connolly Bove Lodge & Hutz, LLP

[57] ABSTRACT

In the method for producing components with a beveled cut edge (Y bevel), a plasma torch is used to make a vertical cut through a preferably flat material and then a laser beam is used to make an inclined cut along the cut edge produced.

9 Claims, 1 Drawing Sheet a)

b)

c)

METHOD FOR CUTTING Y BEVELS

This application is related to DE 198 35 062.7 filed on Aug. 4, 1998, which is incorporated by reference in its entirety for all purposes.

BACKGROUND OF THE INVENTION

The invention relates to a method for cutting Y bevels by means of a laser.

It is often essential to chamfer sheet-metal edges, for example in shipbuilding or in the construction of plant and machinery, in order for a subsequent welding process to be carried out. The chamfering of sheet-metal edges by means of inclined laser cutting on the isolated component is described in Laser 5, 1997, pp. 6–10. In such a method, firstly a vertical cut has to be carried out using the laser, and then the top part of the cut surface has to be removed by means of an inclined cut. This method has the drawback that the leftover metal sheet has to be removed from the cutting bench in order to create sufficient space for the slag to be expelled during the inclined cutting operation. Otherwise, there is a risk of the product and the leftover metal sheet fusing together. A handling operation is required for the leftover metal sheet to be removed. This operation entails the drawback that the position of the component (product) may change.

Cuts made in the reverse order (firstly inclined cut, followed by vertical cut) do not give a satisfactory result. The inclined cutting gap prevents a clean vertical cut from being formed, since the slag cannot be expelled cleanly downwards.

SUMMARY OF THE INVENTION

The invention is based on the object of providing a method which does not have the drawbacks mentioned above.

In accordance with this invention components are produced with a beveled cut edge. A plasma torch is used to make a vertical cut through a material. Then a laser beam is used to make an inclined cut along the cut edge produced on the component.

THE DRAWINGS

FIG. 1a to FIG. 1c diagrammatically show the method steps for practicing the invention.

DETAILED DESCRIPTION

A suitable appliance with a plasma torch and laser for carrying out the method according to the invention is, for example, a laser-cutting appliance with a plasma head and a rotary laser head, which can be procured under the name LaserMat® from Messer Cutting & Welding. The laser-cutting appliance is described in Brochure No. 0,815,090, edition 9207/III dd, Messer Griesheim Schweißtechnik GmbH + Co. 1998, relating to the LaserMat® machine, available from Messer Griesheim Schweißtechnik GmbH + Co., Cutting Systems Division, Otto-Hahn-Str. 2–4, D-64823 Groß-Umstadt, to which brochure reference is hereby made.

The method is preferably suitable for producing flat components, preferably from flat materials, such as metal sheets.

The thickness of the machined metal sheets generally lies in the range from 1 to 50 mm, preferably in the range from 5 to 20 mm. The metal sheets consist, for example, of steel, structural steel or shipbuilding steel, stainless steel or aluminium.

The gap width of the vertical cuts made using the plasma torch generally lies in the range from 1 to 10 mm, preferably 2 to 6 mm, particularly preferably 3 to 5 mm, in particular in the vicinity of 4 mm.

The method for cutting Y bevels uses a machine which has a plasma torch for making vertical cuts and a machining head for lasers, with which inclined cuts can be made. According to the invention, the Y bevel is produced as follows:

The contour of the component is produced using the plasma torch. The plasma cutting method produces a cut gap with a width of preferably approximately 4 mm. This cut gap is wide enough for it to be possible to produce the Y bevel in a second cutting operation using the laser. Depending on the type of torch, the accuracy of plasma-cutting methods is between 0.5 mm and 2 mm. If the accuracy of the vertical cut which can be achieved with the plasma torch is insufficient for a particular application, a three-stage method is proposed: the contour is produced using the plasma torch. By means of a vertical cut using the laser beam, the component is trimmed further in order to achieve a laser cutting accuracy of approximately 0.1 mm. In the final step, the inclined laser head is used to produce the Y bevel.

Figure 1:
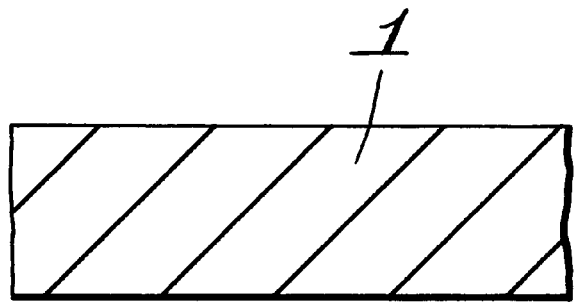
Figure 1:
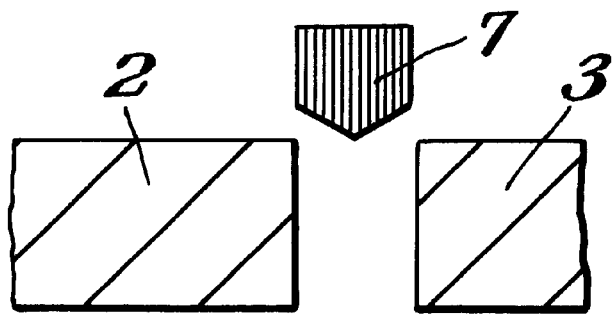
Figure 1:
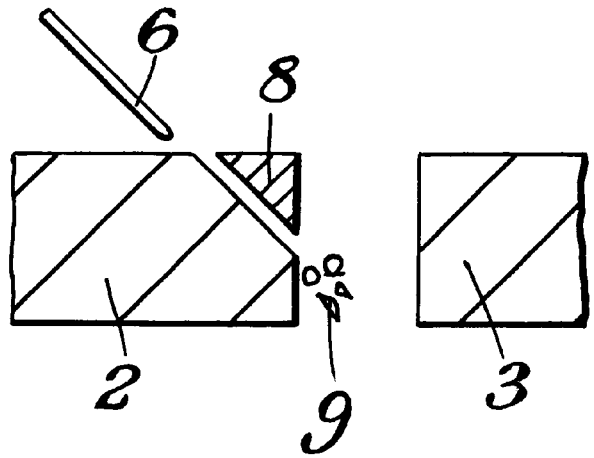

The method according to the invention is explained with reference to FIG. 1, using the example of a steel sheet as the flat material.

FIGS. 1a) to c) diagrammatically show the method steps involved in the plasma-laser method.

FIG. 1a) shows the metal sheet 1 before machining. FIG. 1b) shows the metal sheet 1 after a vertical cut has been made using plasma jet 7, with a cut width of 4 mm, for example. The resultant parts component 2 and leftover metal sheet 3 can be seen. Leftover metal sheet 3 is not removed. In the next step, FIG. 1c), the inclined cutting operation takes place using laser beam 6, with the laser head positioned at an angle, forming the component 2 with a finished cut edge (Y bevel), waste piece 8 and slag 9. The slag 9 can be driven out into the wide cut gap of the plasma cut.

What is claimed is:

1. A method for producing components with a beveled cut edge comprising making a vertical cut through a material with a plasma torch to form a cut edge, and then making an inclined cut along the cut edge with a laser beam to thereby bevel the cut edge with the material remaining in place during both cuts.

2. The method as claimed in claim 1, wherein the material used is metal sheets whose thickness lies in the range from 1 to 50 mm.

3. The method as claimed in claim 2, wherein the plasma torch produces a cut whose width lies in the range from 1 to 10 mm.

4. The method as claimed in claim 3, wherein no parts of the material are removed during the method.

5. The method as claimed in claim 4, wherein the cut edge which is produced using a plasma torch is machined further using a laser.

6. The method as claimed in claim 1, wherein the plasma torch produces a cut whose width lies in the range from 1 to 10 mm.

7. The method as claimed in claim 1, wherein no parts of the material are removed during the method.

8. The method as claimed in claim 1, wherein the cut edge which is produced using a plasma torch is machined further using a laser.

9. In a method for producing flat components with a beveled cut edge, the improvement being in making a cut through the component with a plasma torch, making a further cut through the component with a laser cutting appliance, and inclining the cuts to each other to produce a beveled cut edge with the material remaining in place during both cuts.

* * * * *